(12) United States Patent
Lee et al.

(10) Patent No.: US 7,876,494 B1
(45) Date of Patent: Jan. 25, 2011

(54) ELECTRONIC PAPER DISPLAY DEVICE AND METHOD OF MANUFACTURING THE SAME

(75) Inventors: Sang Moon Lee, Seoul (KR); Hwan-Soo Lee, Seoul (KR); Young Woo Lee, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 12/753,059

(22) Filed: Apr. 1, 2010

(30) Foreign Application Priority Data

Dec. 1, 2009 (KR) .................... 10-2009-0117646

(51) Int. Cl.
*G02B 26/00* (2006.01)

(52) U.S. Cl. ........................ 359/296; 359/290
(58) Field of Classification Search .............. 59/296
See application file for complete search history.

(56) References Cited

U.S. PATENT DOCUMENTS 6,521,145 B1    2/2003    Engler et al.

2010/0035377 A1*    2/2010    Gobrogge et al. .......... 438/99

* cited by examiner

*Primary Examiner*—Jordan M. Schwartz
*Assistant Examiner*—James C Jones
(74) *Attorney, Agent, or Firm*—McDermott Will & Emery LLP

(57) ABSTRACT

There is provided an electronic paper display device and a method of manufacturing the same. The electronic paper display device includes first and second electrodes opposing each other, a plurality of rotary bodies disposed between the first and second electrodes and having electrical and optical anisotropy, elastomer matrix blocks each surrounding at least one of the plurality of rotary bodies and spaced apart from each other, and an optical adhesive formed between the elastomer matrix blocks. The electronic paper display device achieves a high contrast ratio and a relative low driving voltage. Also, the use of the optical adhesive facilitates the adhesion of the first and second electrodes, and blocks the vaporization of dielectric liquid filing a cavity, thereby ensuring high reliability.

12 Claims, 3 Drawing Sheets

ELECTRONIC PAPER DISPLAY DEVICE AND METHOD OF MANUFACTURING THE SAME

CROSS-REFERENCE TO RELATED APPLICATIONS

This application claims the priority of Korean Patent Application No. 10-2009-0117646 filed on Dec. 1, 2009, in the Korean Intellectual Property Office, the disclosure of which is incorporated herein by reference.

BACKGROUND OF THE INVENTION

1. Field of the Invention

The present invention relates to an electronic paper display device and a method of manufacturing the same, and more particularly, to an electronic paper display device having a high contrast ratio and high reliability and requiring low driving voltage, and a method of manufacturing the same.

2. Description of the Related Art

A shift in information exchange and sharing methods is currently in demand, corresponding to the information society requiring a new paradigm. To meet this demand, the development of technologies associated with flexible electronic paper has recently been accelerated and has now entered the phase of commercial development.

Compared with existing flat display panels, an electronic paper display requires relatively low manufacturing costs, and is far superior in terms of energy efficiency since it is operable even with a very low level of energy since backlighting or continuous recharge is unnecessary. Furthermore, the electronic paper enables a high definition display, provides a wide viewing angle, and is equipped with a memory function that retains the display of letters (characters) even when not powered. The above-described advantages make electronic paper applicable in a wide variety of technical fields, such as electronic books having paper-like sheets and moving illustrations, self-updating newspapers, reusable paper displays for mobile phones, disposable TV screens, and electronic wallpaper. There is a massive potential market for such electronic paper.

A technical approach for the implementation of electronic paper may be roughly divided into four methods: a twist-ball method, an electrophoretic method, a quick response-liquid power display (QR-LPD) method, and a cholesteric liquid crystal display method. Here, the twist ball method involves rotating spherical particles, each having upper and lower hemispheres having opposite electrical charges and different colors, by using an electric field. As for the electrophoretic method, colored charged particles mixed with oil are trapped in micro-capsules or micro-cups, or charged particles are made to respond to the application of an electric field. The QR-LPD method uses charged powder. The cholesteric liquid crystal display method uses the selective reflection of cholesteric liquid crystal molecules.

As for the twist-ball method, cells are filled with a transparent medium, and twist balls, each having opposite electrical charges and is colored with different colors, for example black and white, are disposed in the transparent medium. Each twist ball, when receiving voltage, rotates such that its part, having an opposite polarity to the received electric charge, faces the front. In such a manner, black and white are displayed.

In general, the twist balls are disposed inside an elastomer matrix. Thus, the arrangement of the twist balls is not consistent, and it is difficult to attach a driving circuit thereto.

SUMMARY OF THE INVENTION

An aspect of the present invention provides an electronic paper display device having a high contrast ratio and high reliability and requiring low driving voltage, and a method of manufacturing the same.

According to an aspect of the present invention, there is provided an electronic paper display device including: first and second electrodes opposing each other; a plurality of rotary bodies disposed between the first and second electrodes and having electrical and optical anisotropy; elastomer matrix blocks each surrounding at least one of the plurality of rotary bodies and spaced apart from each other; and an optical adhesive formed between the elastomer matrix blocks.

Each of the elastomer matrix blocks may surround a single rotary body among the plurality of rotary bodies.

The electronic paper display device may further include a cavity formed between each of the rotary bodies and a corresponding one of the elastomer matrix blocks, the cavity being filled with dielectric liquid.

The elastomer matrix block may be formed of at least one selected from the group consisting of polyethylene terephthalate (PET), polycarbonate (PC), poly (methyl methacrylate) (PMMA), polyethylene naphthalate (PEN), polyethersulfone (PES), cyclic olefin copolymer (COC), polydimethylsiloxane (PDMS), and poly urethane acrylate (PUA).

Each of the rotary bodies may include a first display region colored white, and a second display region colored black, and the first display region and the second display region have different electrical charge properties.

Each of the rotary bodies may include a first display region colored white or black, and a second display region colored red, green or blue, and the first display region and the second display region have different electrical charge properties.

Each of the rotary bodies may have a spherical, oval or cylindrical shape.

According to another aspect of the present invention, there is provided a method of manufacturing an electronic paper display device, including: forming a partition wall structure using a water-soluble polymer, the partition wall structure including a plurality of partition walls and a plurality of cell spaces defined by the partition walls; injecting a plurality of rotary bodies and an elastomer matrix into the plurality of cell spaces, the rotary bodies having electrical and optical anisotropy; forming a first electrode on the partition wall structure such that the first electrode covers the rotary bodies and the elastomer matrix; removing the partition wall structure to form elastomer matrix blocks each surrounding at least one of the rotary bodies and spaced apart from each other; injecting an optical adhesive between the elastomer matrix blocks; and forming a second electrode on the elastomer matrix blocks and the optical adhesive such that the second electrode opposes the first electrode.

The partition wall structure may be formed by using imprinting, laser-patterning, photolithography or etching.

The removing of the partition wall structure may be performed by dissolving the water-soluble polymer in water.

The method may further include forming an optical adhesive covering the rotary bodies and the elastomer matrix before the forming of the first electrode.

The method may further include forming a cavity around each of the rotary bodies after the removing of the partition wall structure, the cavity being filled with dielectric liquid.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
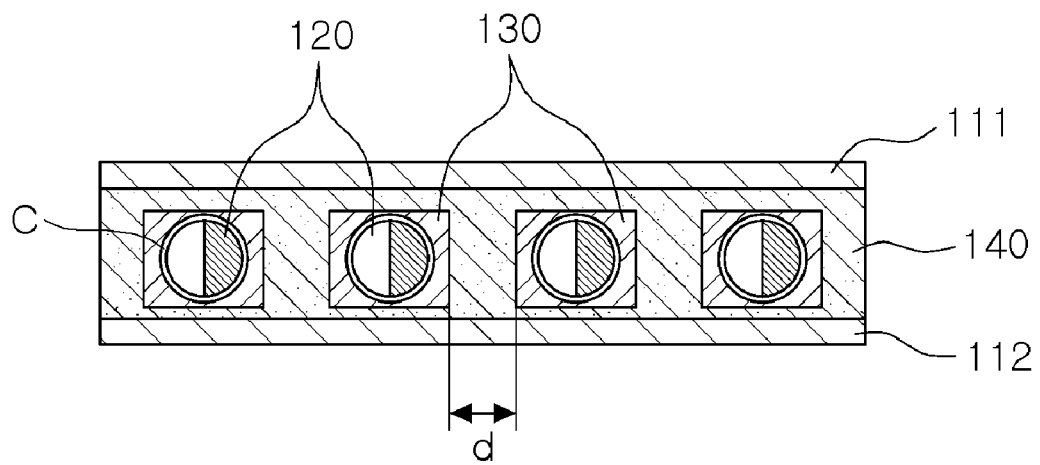
FIG. 1 is a schematic cross-sectional view illustrating an electronic paper display device according to an exemplary embodiment of the present invention.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and sizes of elements may be exaggerated for clarity. Like reference numerals in the drawings denote like elements.

Figure 2:
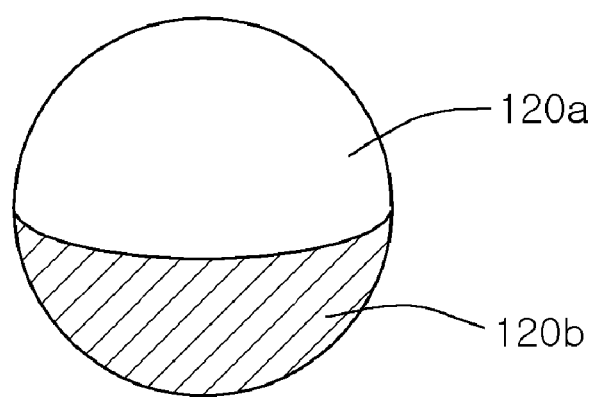
FIG. 2 is an enlarged perspective view illustrating a rotary body according to an exemplary embodiment of the present invention.

FIG. 1 is a schematic cross-sectional view illustrating an electronic paper display device according to an exemplary embodiment of the present invention. FIG. 2 is an enlarged perspective view illustrating a rotary body according to an exemplary embodiment of the present invention.

Referring to FIG. 1, an electronic paper display device, according to this exemplary embodiment, includes first and second electrodes 111 and 112 opposing each other, a plurality of rotary bodies 120 disposed between the first and second electrodes 111 and 112, elastomer matrix blocks 130 each surrounding at least one of the plurality of rotary bodies 120 and spaced apart from each other, and an optical adhesive 140 disposed between the elastomer matrix blocks 130.

The first and second electrodes 111 and 112 oppose each other. Voltage is applied to the rotary bodies 120 through the first and second electrodes 111 and 112. The electronic paper display device, according to this exemplary embodiment, may include a control unit (not shown) in order to control the magnitude and direction of voltage being applied to the rotary bodies 120.

The rotary bodies 120 are surrounded by the elastomer matrix blocks 130, respectively. According to this exemplary embodiment, a single rotary body 120 is illustrated as being surrounded by a single elastomer matrix block 130. However, one or more rotary bodies may be surrounded by a single elastomer matrix block.

The elastomer matrix block 130 may be formed of a flexible resin. The resin may utilize, for example, polyethylene terephthalate (PET), polycarbonate (PC), poly(methyl methacrylate) (PMMA), polyethylene naphthalate (PEN), polyethersulfone (PES), cyclic olefin copolymer (COC), polydimethylsiloxane (PDMS), poly urethane acrylate (PUA), or a mixture thereof. However, the resin is not limited to the above described materials.

Notably, polydimethylsiloxane (PDMS) is easily bonded with or separated from a different kind of material. Therefore, polydimethylsiloxane (PDMS) may be preferably utilized.

In addition, a cavity C may be formed around each rotary body 120, that is, between each rotary body 120 and the elastomer matrix block 130 surrounding the rotary body 120. The cavity C is filled with dielectric liquid so that the rotary body 120 can easily rotate.

The elastomer matrix blocks 130 are spaced apart from each other at a predetermined distance d therebetween. The optical adhesive 140 is formed between these elastomer matrix blocks 130, that is, in a region corresponding to the predetermined distance d.

The optical adhesive 140 facilitates the adhesion of the first and second electrodes 111 and 112. The optical adhesive 140 may also serve to prevent the vaporization of the dielectric liquid filling the cavity C.

The optical adhesive 140 is not limited specifically, and may utilize a generally known optical adhesive.

According to this exemplary embodiment, the rotary body 120 has electrical and optical anisotropy. When voltage is applied to the rotary body 120, the rotary body, having electrical and optical anisotropy, rotates according to the direction of the applied voltage, thereby displaying black or white.

Referring to FIG. 2, the rotary body 120 is colored with different colors, and has two display regions 120a and 120b manifesting different electrical-charge properties. The two display regions 120a and 120b may be colored with different colors. The first display region 120a may be colored white, and the second display region 120b may be colored black. When the first display region 120a is positively charged, the second display region 120b is negatively charged. When voltage is applied to the rotary body 120, the rotary body 120 rotates according to the magnitude and direction of the applied voltage, and displays black or white due to the respective colors of the two display regions 120a and 120b.

A method known in the art may be used as the method of forming the first and second display regions 120a and 120b by electrically and optically treating the rotary body 120. For example, a method of applying centrifugal force to the rotary body, put into a revolving disk provided with two coloring solutions, may be used.

The shape of the rotary body 120 is not limited specifically. For example, the rotary body 120 may have an oval shape or a cylindrical shape.

The rotary body 120, according to this exemplary embodiment, is illustrated as having two display regions. However, the rotary body 120 may have three or more display regions if necessary.

In addition, the display regions may be colored with a variety of colors other than black or white.

For example, the first display region 120a may be colored white or black, and the second display region 120b may be colored red, green or blue. In this case, each rotary body may display red, green or blue.

According to this exemplary embodiment, the electronic paper display device has a monolayer structure, and includes rotary bodies densely arranged within a small thickness range. Accordingly, the electronic paper display device, according to this exemplary embodiment, can achieve an increase in contrast ratio and a reduction in distance between the first and second electrodes, thereby requiring a relatively low driving voltage.

Furthermore, as described above, the use of the optical adhesive 140 facilitates the adhesion of the first and second electrodes 111 and 112, and prevents the vaporization of the dielectric liquid filling the cavity, thereby allowing for high reliability.

Hereinafter, a method of manufacturing an electronic paper display device according to an exemplary embodiment of the present invention will be described.

FIGS. 3A through 3F are cross-sectional views illustrating the process of manufacturing an electronic paper display device according to an exemplary embodiment of the present invention.

Figure 3A:
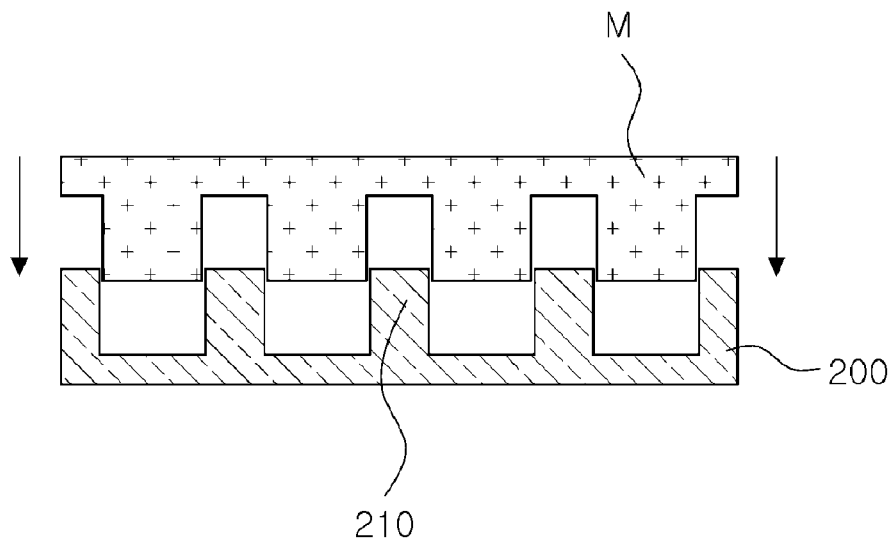
FIGS. 3A through 3F are cross-sectional views illustrating the process of manufacturing an electronic paper display device according to an exemplary embodiment of the present invention.

First, as shown in FIG. 3A, a partition wall structure 200 is formed. The partition wall structure 200 includes a plurality of partition walls 210 and a plurality of cell spaces defined by the partition walls 210.

The partition wall structure 200 may be formed of a water-soluble polymer. The water-solution polymer may utilize, for example, polyvinyl alcohol, polyvinyl pyrrolidone, poly acrylamide, methylcellulose, carboxymethyl cellulose, or the like. However, the material of the partition wall structure 200 is not limited to the above-described materials.

The partition wall structure 200 is formed by forming a structure with a predetermined thickness using a water-soluble polymer, and performing imprinting, laser-patterning, photography, etching or the like on the structure.

In greater detail, a structure, having a predetermined thickness, is formed of a water-soluble polymer. The structure is then pressed with a stamp (M) having raised and depressed patterns to thereby form a partition wall structure having partition walls 210 and cell spaces corresponding to the raised and depressed patterns of the stamp. The intervals between the partition walls and the shape and size of the cell spaces may be controlled by adjusting the raised and depressed patterns of the stamp.

According to this exemplary embodiment, the size of the cell space may be rather greater than the diameter of the rotary body 120 so that a single rotary body 120 may be disposed therein.

In the event that a single elastomer matrix block surrounds more than one rotary body, the size of the cell space may be somewhat greater than the sum of the diameters of the rotary bodies disposed therein.

The height of the partition wall 210 may be equal to or greater than the diameter of rotary bodies 120 which will be disposed later.

Figure 3B:
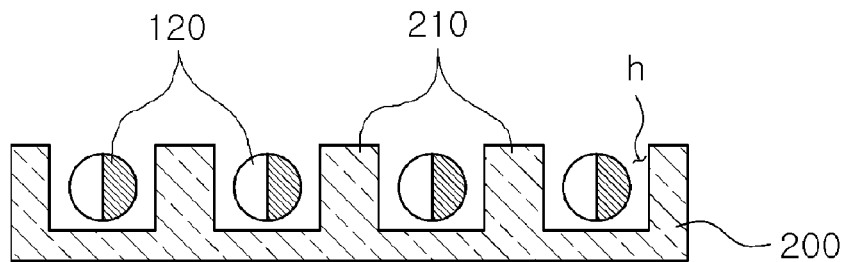

Thereafter, as shown in FIG. 3B, the rotary bodies 120 are disposed in the plurality of cell spaces h formed in the partition wall structure 200, respectively. Here, the rotary bodies 120 have electrical and optical anisotropy.

A squeegee or the like may be used in order to place the rotary bodies 120 into the cell spaces h. In more detail, a mask or a filter exposing only the cell spaces h may be disposed on the partition wall structure 200, and the rotary bodies 120 may be then injected into the respective cell spaces h by using a squeegee.

Figure 3C:
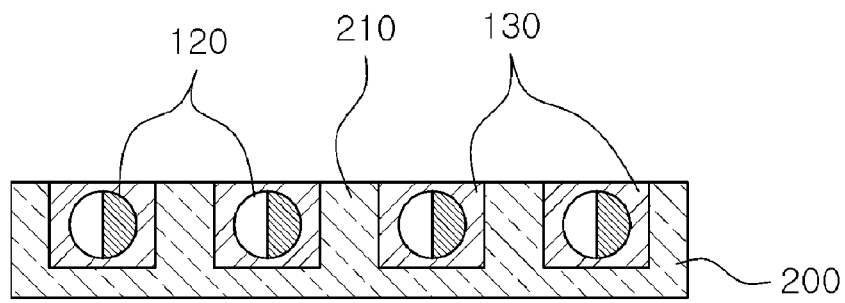

Subsequently, as shown in FIG. 3C, an elastomer matrix is injected into the cell spaces h so as to cover the rotary bodies 120 placed in the cell spaces h of the partition wall structure 200.

The elastomer matrix is injected into the cell spaces h, and is then cured at a predetermined temperature for a predetermined duration.

For example, in the event that PDMS is used as the elastomer matrix, it takes approximately 24 hours at a room temperature, approximately 4 hours at a temperature of 70° C., approximately an hour at a temperature of 100° C., or approximately 15 minutes at a temperature of 150° C. to complete the curing process.

In such a manner, the elastomer matrix surrounds the rotary bodies 120.

Figure 3D:
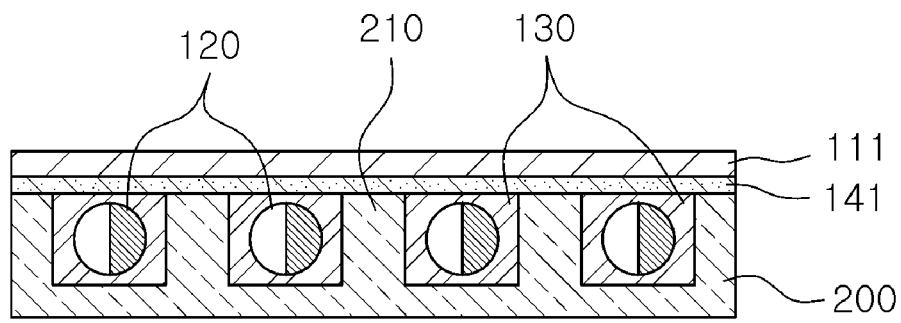

Thereafter, as shown in FIG. 3D, a first electrode 111 is formed on the partition wall structure 200 so as to cover the elastomer matrix surrounding the rotary bodies 120.

Here, the first electrode 111 may be formed after an optical adhesive 141 is formed on the partition wall structure 200. The first electrode 111 may be formed of indium tin oxide (ITO).

The use of the optical adhesive 141 contributes to enhancing a coupling force between the first electrode 111 and the elastomer matrix.

Figure 3E:
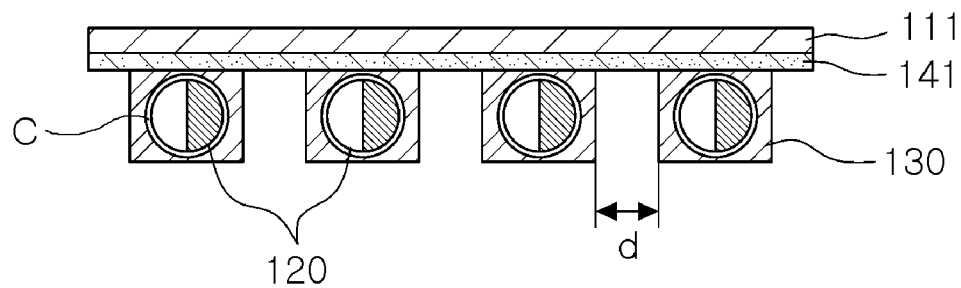

Thereafter, as shown in FIG. 3E, the partition wall structure 200 is removed. Since the partition wall structure 200 is formed of a water-soluble polymer, it can be removed by dissolving the water-soluble polymer in water.

The partition wall structure 200 may be removed by immersing it in a predetermined amount of water for a predetermined duration. Accordingly, elastomer matrix blocks 130 corresponding to the cell spaces protrude, and are spaced apart from each other at a distance d corresponding to the partition wall 210.

Subsequently, cavities C are formed around the respective rotary bodies 120 surrounded by the elastomer matrix blocks 130.

The cavities C are formed by immersing the elastomer matrix blocks 130 in dielectric liquid and performing an ultrasonic process thereon. When the elastomer matrix blocks 130 are dipped into the dielectric liquid, the dielectric liquid permeates around the rotary bodies 130 and encircles the rotary bodies 130 to thereby form the respective cavities C.

Here, the elastomer matrix blocks 130 surrounding the respective rotary bodies 120 have a wide contact area with the dielectric liquid, thereby facilitating the formation of the cavities C.

Figure 3F:
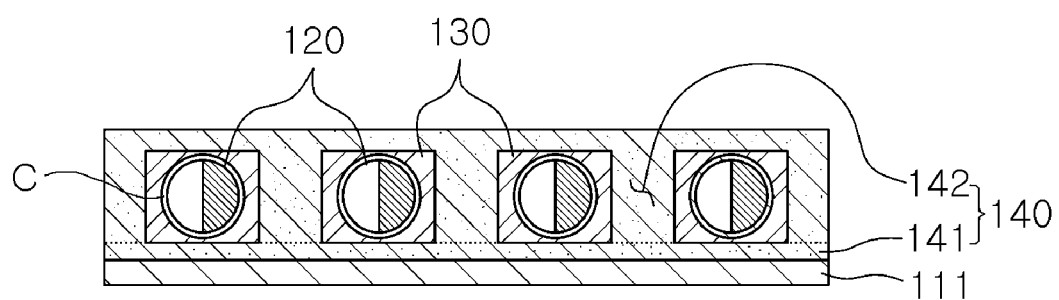

Thereafter, as shown in FIG. 3F, an optical adhesive 142 is injected between the elastomer matrix blocks 130, that is, in a space between the elastomer matrix blocks 130 spaced apart from each other at the distance d Subsequently, a second electrode, opposing the first electrode 111, is formed on the optical adhesive 142. The second electrode may be formed of indium tin oxide (ITO) or the like. In the above-described manner, an electronic paper display device as depicted in FIG. 1 is manufactured.

As set forth above, according to exemplary embodiments of the invention, the electronic paper display device is configured to have a monolayer structure, and the rotary bodies are densely arranged within a small thickness range. Accordingly, a contrast ratio can be increased, and a reduction in interval between the first and second electrodes can be achieved. Thus, the electronic paper display device can operate at relatively low driving voltage.

Furthermore, the use of the optical adhesive serves to facilitate the bonding of the first and second electrodes and to prevent the vaporization of the dielectric liquid filling the cavity, thereby realizing high reliability.

While the present invention has been shown and described in connection with the exemplary embodiments, it will be apparent to those skilled in the art that modifications and variations can be made without departing from the spirit and scope of the invention as defined by the appended claims.

What is claimed is:

1. An electronic paper display device comprising:
   first and second electrodes opposing each other;

a plurality of rotary bodies disposed between the first and second electrodes and having electrical and optical anisotropy;

elastomer matrix blocks spaced apart from each other, each elastomer matrix blocks surrounding at least one of the plurality of rotary bodies; and an optical adhesive formed between the elastomer matrix blocks.

2. The electronic paper display device of claim 1, wherein each of the elastomer matrix blocks surrounds a single rotary body among the plurality of rotary bodies.

3. The electronic paper display device of claim 1, further comprising a cavity formed between each of the rotary bodies and a corresponding one of the elastomer matrix blocks, the cavity being filled with dielectric liquid.

4. The electronic paper display device of claim 1, wherein the elastomer matrix block is formed of at least one selected from the group consisting of polyethylene terephthalate (PET), polycarbonate (PC), poly(methyl methacrylate) (PMMA), polyethylene naphthalate (PEN), polyethersulfone (PES), cyclic olefin copolymer (COC), polydimethylsiloxane (PDMS), and poly urethane acrylate (PUA).

5. The electronic paper display device of claim 1, wherein each of the rotary bodies includes a first display region colored white, and a second display region colored black, and
the first display region and the second display region have different electrical charge properties.

6. The electronic paper display device of claim 1, wherein each of the rotary bodies includes a first display region colored white or black, and a second display region colored red, green or blue, and
the first display region and the second display region have different electrical charge properties.

7. The electronic paper display device of claim 1, wherein each of the rotary bodies has a spherical, oval or cylindrical shape.

8. A method of manufacturing an electronic paper display device, the method comprising:

forming a partition wall structure using a water-soluble polymer, the partition wall structure including a plurality of partition walls and a plurality of cell spaces defined by the partition walls;

injecting a plurality of rotary bodies and an elastomer matrix into the plurality of cell spaces, the rotary bodies having electrical and optical anisotropy;

forming a first electrode on the partition wall structure such that the first electrode covers the rotary bodies and the elastomer matrix;

removing the partition wall structure to form elastomer matrix blocks spaced apart from each other, each elastomer matrix block surrounding at least one of the rotary bodies;

injecting an optical adhesive between the elastomer matrix blocks; and forming a second electrode on the elastomer matrix blocks and the optical adhesive such that the second electrode opposes the first electrode.

9. The method of claim 8, wherein the partition wall structure is formed by using imprinting, laser-patterning, photolithography or etching.

10. The method of claim 8, wherein the removing of the partition wall structure is performed by dissolving the water-soluble polymer in water.

11. The method of claim 8, further comprising forming an optical adhesive covering the rotary bodies and the elastomer matrix before the forming of the first electrode.

12. The method of claim 8, wherein further comprising forming a cavity around each of the rotary bodies after the removing of the partition wall structure, the cavity being filled with dielectric liquid.

* * * * *